Dec. 15, 1942.  P. FREDERICKSON  2,304,811
WEED PULLER
Filed Jan. 17, 1941  2 Sheets-Sheet 1
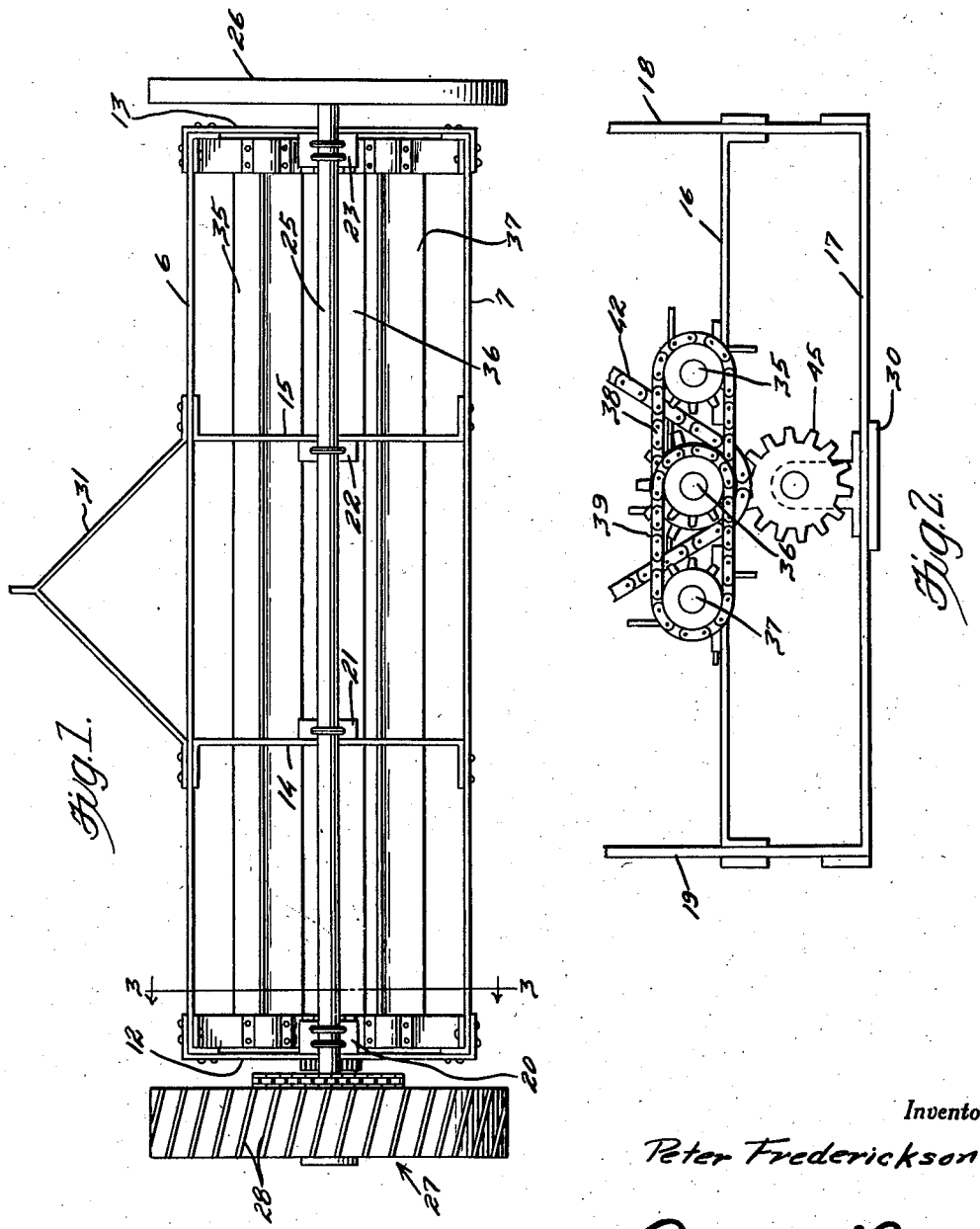
Inventor
Peter Frederickson
By *Clarence A. O'Brien*
Attorney Dec. 15, 1942. P. FREDERICKSON 2,304,811
WEED PULLER
Filed Jan. 17, 1941 2 Sheets-Sheet 2

Inventor
Peter Frederickson

By Clarence A. O'Brien

Attorney

Patented Dec. 15, 1942

2,304,811

UNITED STATES PATENT OFFICE 2,304,811

WEED PULLER

Peter Frederickson, Dannebrog, Nebr.

Application January 17, 1941, Serial No. 374,939

4 Claims. (Cl. 55—66)

My invention relates to improvements in weed pullers, and the primary object of my invention is to provide a simple and efficient machine of this character which is effective for the pulling of short weeds, particularly those between the lengths of five and eight inches, such as Russian thistles and other weeds out of summer fallowed ground and stubble fields.

Other important objects and advantages of my invention will be apparent from a reading of the following description taken in connection with the appended drawings, wherein for purposes of illustration I have shown a preferred embodiment of my invention.

In the drawings—

Figure 1 is a general top plan view of the embodiment.

Figure 2 is a fragmentary left hand end elevational view.

Figure 3:
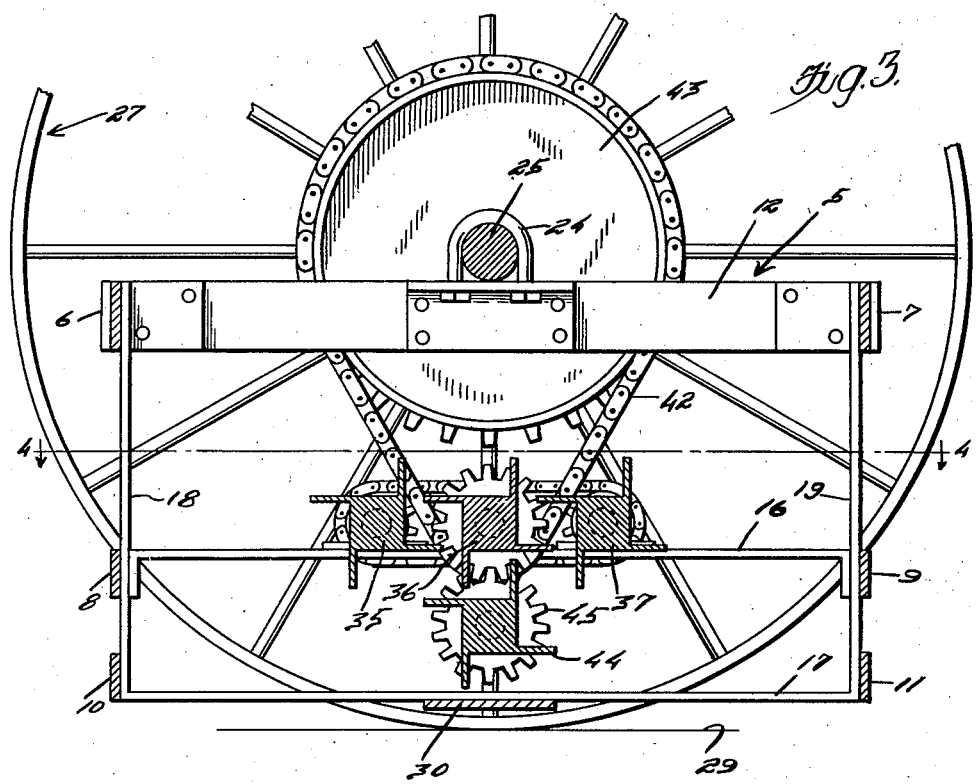
Figure 3 is a fragmentary enlarged transverse vertical sectional view taken through Figure 1 along the line 3—3 and looking toward the left in the direction of the arrow.
Figure 4:
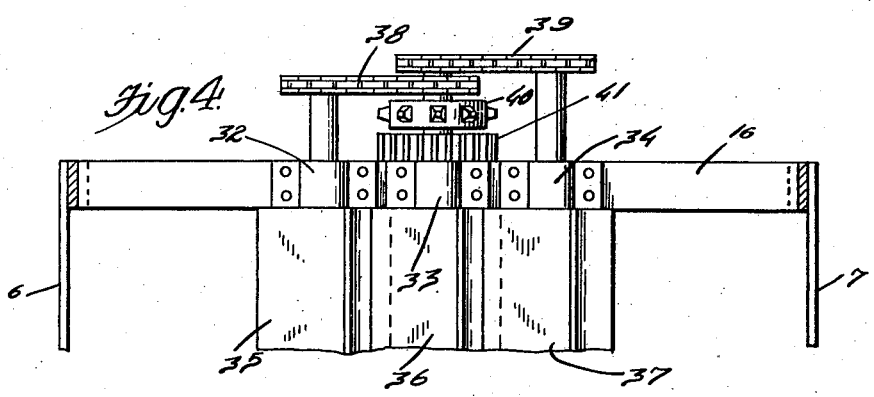
Figure 4 is a fragmentary top plan view partly in section of Figure 2.
Figure 5:
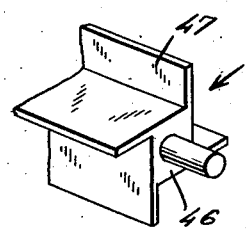
Figure 5 is a fragmentary perspective view of one of the beaters.

Referring in detail to the drawings, the numeral 5 generally designates a transversely elongated generally rectangular frame which consists of front and rear upper members 6 and 7, intermediate members 8 and 9 and lower members 10 and 11, the ends of the upper members being deflected forwardly and rearwardly at right angles to be overlapped by similarly formed front and rear ends on the end members 12 and 13, respectively. Forwardly and rearwardly extending braces 14 and 15, located in intermediate positions and equally spaced from the opposite ends of the frame, are connected to the front and rear upper members 6 and 7 as indicated in Figure 1 of the drawings, while at the opposite ends of the frame intermediate and lower cross members 16 and 17, respectively, are connected to the intermediate and lower front and rear members 8, 9, 10 and 11, respectively, and are also connected with appropriately situated front and rear vertical members 18 and 19, respectively. Suitable brackets 20, 21, 22, and 23 mounted on upper longitudinal braces as indicated in Figure 1 have fastened thereto as indicated by the numeral 24 a stationary main axle 25 which extends beyond the ends of the frame to rotatably support the idle wheel 26 at the right hand end and the working wheel 27 at the opposite end, the latter being provided with cleats 28 for adequate purchase on the ground 29. The wheels are of sufficient diameter to support the lower members 17 of the frame 5 about an inch or so above the ground. To the bottoms of the longitudinal braces 17 is connected a bar 30 which acts in conjunction with the beaters to be described to position and feed the weeds as the weed puller is drawn over the ground by suitable tractor means applied to the wishbone type drawbar 31 which is attached to the upper front member 6 as shown in Figure 1.

On the intermediate braces 16 at the opposite ends of the frame are affixed a trio of horizontally aligned bearings 32, 33 and 34 which rotatably support the stub shafts on the opposite ends of the horizontally aligned beaters 35, 36 and 37, respectively. The stub shaft on one end of the beater 35 has a sprocket wheel connected by a sprocket chain 38 with a similar sized sprocket on the stub shaft of the beater 36. A second sprocket wheel on the stub shaft of the beater 36 is connected by a sprocket chain 39 with a similarly sized sprocket wheel on the stub shaft of the beater 37. The stub shaft of the middle beater 36 has a sprocket wheel 40 and a gear wheel 41 fixed thereon, the sprocket wheel 40 being connected by a sprocket chain 42 with a relatively large sprocket wheel 43 secured concentrically on the drive wheel 27.

A lower beater 44 is mounted below the level of the beaters 35, 36 and 37 in similar bearings depending from the cross member 16, and in alignment with the middle beater 36. The stub shaft at the adjacent end of the lower beater 44 has a gear wheel 45 fixed thereon in mesh with the gear 41. As a result of these arrangements the beaters 35, 36 and 37 rotate in coordination at the same speed and in the same direction, while the lower beater 44 rotates in the opposite direction at the same speed and in coordination with the other beaters.

The beaters are all similar in construction and formation, each comprising a rectangular body section 46 from the opposite corners of which project flanges 47 of substantially equal width and length and related to each other approximately at right angles. The flanges extend all across the beaters which extend the full width of the frame 5.

The upper beaters 35, 36 and 37 are slightly inter-spaced so that their flanges 47 slightly overlap in certain positions as illustrated in Figure 3 of the drawings. The lower beater 44 is directly under the middle beater 36 and only a small fraction of an inch clearance is provided between them.

In operation, the weeds strike the beater 44 and the bar 30 substantially simultaneously and then are passed up through the beaters 45 and 36. The beater 37 helps to push the weeds up into and between the other beaters while the beater 35 helps to discharge the pulled weeds. It will be noted that the bar 30 operates to keep the beaetr 44 out of contact with the ground.

The beaters rotate in the direction of the arrows in Figure 3.

Although I have shown and described a preferred embodiment of my invention, it is to be definitely understood that I do not desire to limit the application of the invention thereto, except as may be required by the scope of the subjoined claims.

Having described the invention, what is claimed as new is:

1. A weed puller comprising a transversely elongated frame, an axle supported across the frame, wheels on the opposite ends of said axle engaging the ground at the opposite ends of said frame, one of said wheels being idle and the other being the driving wheel, a plurality of transversely extending substantially horizontally aligned upper rotary beaters on said frame, and a single lower rotary beater below the other beaters and parallel therewith in close proximity to the ground, and means operatively connecting said driving wheel with the upper beaters for rotation together in the same direction and connecting the single lower beater for rotation with the upper beaters but in the opposite direction.

2. A weed puller comprising a transversely elongated frame, an axle supported across the frame, wheels on the opposite ends of said axle engaging the ground at the opposite ends of said frame, one of said wheels being idle and the other being the driving wheel, a plurality of transversely extending substantially horizontally aligned upper rotary beaters on said frame, and a single lower rotary beater below the other beaters and parallel therewith in close proximity to the ground, and means operatively connecting said driving wheel with the upper beaters for rotation together in the same direction and connecting the single lower beater for rotation with the upper beaters but in the opposite direction, and a horizontal flat bar below said lower beater disposed edgewise as regards the direction of travel of the puller for positioning the weeds to be cut relative to said lower beater.

3. A weed puller comprising a transversely elongated frame, an axle supported across the frame, wheels on the opposite ends of said axle engaging the ground at the opposite ends of said frame, one of said wheels being idle and the other being the driving wheel, a plurality of transversely extending substantially horizontally aligned upper rotary beaters on said frame, and a single lower rotary beater below the other beaters and parallel therewith in close proximity to the ground, and means operatively connecting said driving wheel with the upper beaters for rotation together in the same direction and connecting the single lower beater for rotation with the upper beaters but in the opposite direction, each beater comprising a transversely square shaft-like body, and corner blades on said body coextensive in length therewith and extending each from a different side of said body at a right angle to said side, said plurality of beaters having their blades slightly interspaced.

4. A weed puller comprising a transversely elongated frame, an axle supported across the frame, wheels on the opposite ends of said axle engaging the ground at the opposite ends of said frame, one of said wheels being idle and the other being the driving wheel, a plurality of transversely extending substantially horizontally aligned upper rotary beaters on said frame, and a single lower rotary beater below the other beaters and parallel therewith in close proximity to the ground, and means operatively connecting said driving wheel with the upper beaters for rotation together in the same direction and connecting the single lower beater for rotation with the upper beaters but in the opposite direction, each beater comprising a transversely square shaft-like body, and corner blades on said body coextensive in length therewith and extending each from a different side of said body at a right angle to said side, said plurality of beaters having their blades slightly interspaced, said single lower beater having its blades substantially interspaced with respect to the flanges of one of said upper beaters.

PETER FREDERICKSON.